(12) United States Patent
Cammisano

(10) Patent No.: US 6,799,381 B1
(45) Date of Patent: Oct. 5, 2004

(54) SYSTEM AND METHOD FOR DRYING

(76) Inventor: Gerlarmo P. L. Cammisano, 1500 NE. 50th Ter., Kansas City, MO (US) 64118

( * ) Notice: Subject to any disclaimer, the term of this patent is extended or adjusted under 35 U.S.C. 154(b) by 150 days.

(21) Appl. No.: 09/756,064

(22) Filed: Jan. 8, 2001

(51) Int. Cl.[7] ................................................. F26B 7/00
(52) U.S. Cl. ......................................... 34/397; 134/56
(58) Field of Search ...................... 134/56, 57; 55/162, 55/163

(56) References Cited

U.S. PATENT DOCUMENTS

| | | | |
|---|---|---|---|
| 4,892,569 A | * | 1/1990 | Kojima ......................... 55/163 |
| 4,903,347 A | * | 2/1990 | Garcia et al. ................. 4/420.4 |
| 5,002,593 A | * | 3/1991 | Ichishita et al. .............. 55/218 |
| 5,033,489 A | * | 7/1991 | Ferre et al. .................... 134/57 |
| 5,145,495 A | * | 9/1992 | Elamin ......................... 55/162 |
| 5,266,123 A | | 11/1993 | Brand |
| 5,363,865 A | | 11/1994 | Brand |
| 5,428,963 A | | 7/1995 | Korycki et al. |
| 5,454,123 A | * | 10/1995 | Barabino ....................... 4/662 |
| 5,647,731 A | | 7/1997 | Onozawa |
| 5,820,642 A | | 10/1998 | Nagai et al. |
| 5,951,260 A | | 9/1999 | Cramer et al. |
| 6,068,003 A | | 8/2000 | Kosofsky et al. |
| 2002/0046758 A1 | * | 4/2002 | Caldwell et al. .............. 134/56 |
| 2002/0046759 A1 | * | 4/2002 | Caldwell et al. .............. 134/56 |

OTHER PUBLICATIONS

Internet printout, Cointrol Equipment; "Vehicle Washing Products"; www.cointrol.com, May 26, 2000.

Internet printout, Hanna–Sherman International, Inc.; "Infinity Air Dryer Parts"; www.hanna–sherman.com, May 26, 2000.

Internet printout, SWF, Inc.; www.swfinc.com, May 26, 2000.

Internet printout, Hanna–Sherman International, Inc.; "Concorde Drying System"; www.hanna–sherman.com, May 26, 2000.

* cited by examiner

Primary Examiner—Melvin Jones
(74) Attorney, Agent, or Firm—Lathrop & Gage LC

(57) ABSTRACT

The present invention relates to a system for projecting a pre-selected flow rate of dry compressed air onto a vehicle to prevent accumulation of excess water. The present invention also relates to a method for utilizing a compressed air vehicle drying system.

2 Claims, 2 Drawing Sheets

SYSTEM AND METHOD FOR DRYING

FIELD OF INVENTION

The present invention relates to a pressurized air system for drying the surface of a vehicle. More particularly, the present invention is directed to a system for use in a self service car wash, whereby the system is coin activated so as to allow a user to dry a car using pressurized air projected out of a hand wand.

BACKGROUND OF INVENTION

High pressure car wash stations are designed to allow a person to wash their car by simply paying a small fee to activate the system. These systems are well suited for removing harmful pollutants and residues, particularly salt and tar. Removing this dirt maintains the finish of the paint and helps to preserve the integrity of body panels and underbody welds. These car wash stations allow a user to project water, soap and other cleaning agents through a hand wand and onto a vehicle. Typically, once the vehicle has been washed, a person uses a towel to dry the vehicle, or the user simply drives away, allowing the vehicle to air dry. Some automatic car washing facilities utilize large blowing systems that attempt to wholesale blow dry a vehicle. These large systems generally lack the ability to remove water trapped in recessed areas.

When temperatures drop below freezing, the water used to wash the car may freeze. Resultingly, doors and locks often become frozen. Door lock mechanisms and door jams can become saturated with water and freeze. Once the water freezes in the door lock mechanism or between the door frame and the car body neither the door lock nor the door may properly function. Door lock mechanisms that are coated with frozen water may restrict entry of a key because the frozen water blocks access through the key hole or the lock may simply become inoperable as the mechanism internal to the door may be jammed by the presence of frozen water. Either scenario may present significant problems for the user of the automobile as access to the vehicle may be limited if the doors remain locked.

In a similar fashion, if the water under pressure finds its way into the door jams, the water can freeze causing the door to stick to the vehicle frame. A door frozen to the frame may not open even with the application of considerable pressure. Resultingly, a driver or passenger may be precluded from entering the vehicle or be precluded from exiting from inside the vehicle.

Aside from concerns over water freezing in locks and in door jams, water pooling on a car can leave spots that detract from the overall finish of the vehicle. Traditionally, patrons utilizing a car wash with a hand held spray wand either utilize a chamois, sponge or cloth to remove the water or simply drive the vehicle to dissipate the water that remains after the wash. Removing the standing water with a chamois, sponge or cloth is time consuming, messy and requires transporting the various items to the carwash in order to be utilized following the washing. Moreover, such items are difficult to use during cold weather and can present considerable difficulties for the aged and infirm in any climate. Another problem associated with a chamois is that the owner of the facility derives no profit from use of the chamois.

As such, it is desirable to have a method that allows a car to be easily dried. It is further desirable to have a method that limits contact between the user and water located on the surface of a vehicle. Finally, it is desirable to have a method or device that allows a car wash operator to derive greater profits from an operation.

SUMMARY OF INVENTION

The present invention is directed to a compressed air vehicle drying system suited for use in drying outside surfaces of vehicles after they have been washed. The drying system allows for a timed release of pressurized air intended to rinse water from a vehicle's surface, wherein the compressed air vehicle drying system comprises an air compressor, a storage tank, whereby the storage tank stores compressed air received from the air compressor, an air regulator located proximal to the storage tank, the air regulator designed and dimensioned to allow air to exit the storage tank opposite the air compressor under a pressure ranging between 50 psi and 300 psi, an air dryer is located downstream from the storage tank, a wand having a plurality of holes, the wand located at the system's end; and, the system is activated by a vending unit so that, when activated, the vending unit communicates with a solenoid valve located upstream from the wand with the solenoid valve opening to allow passage of the pressurized air.

BRIEF DESCRIPTION OF INVENTION

DETAILED DESCRIPTION OF INVENTION

The present invention relates to a drying system for use in a self-service car wash. The system is designed to air dry a vehicle by using a hand-held device designed and dimensioned to project air onto a vehicle surface. Such hand-held device is preferably similar to a wand found in a self-service car wash and used to project soap and water onto a vehicle's surface. In the present system, instead of spraying water through the tip of the wand, air is projected. The system is activated by a user placing coins or other currency in a vending machine. Beneficially, the wand allows the user to project air to precise areas on the vehicle. As such the user can dry their car, without contacting water on the surface of the vehicle. Also, a fee is collected by the owner of such a system, thereby increasing the profitability of a self-service car wash.

Figure 1:
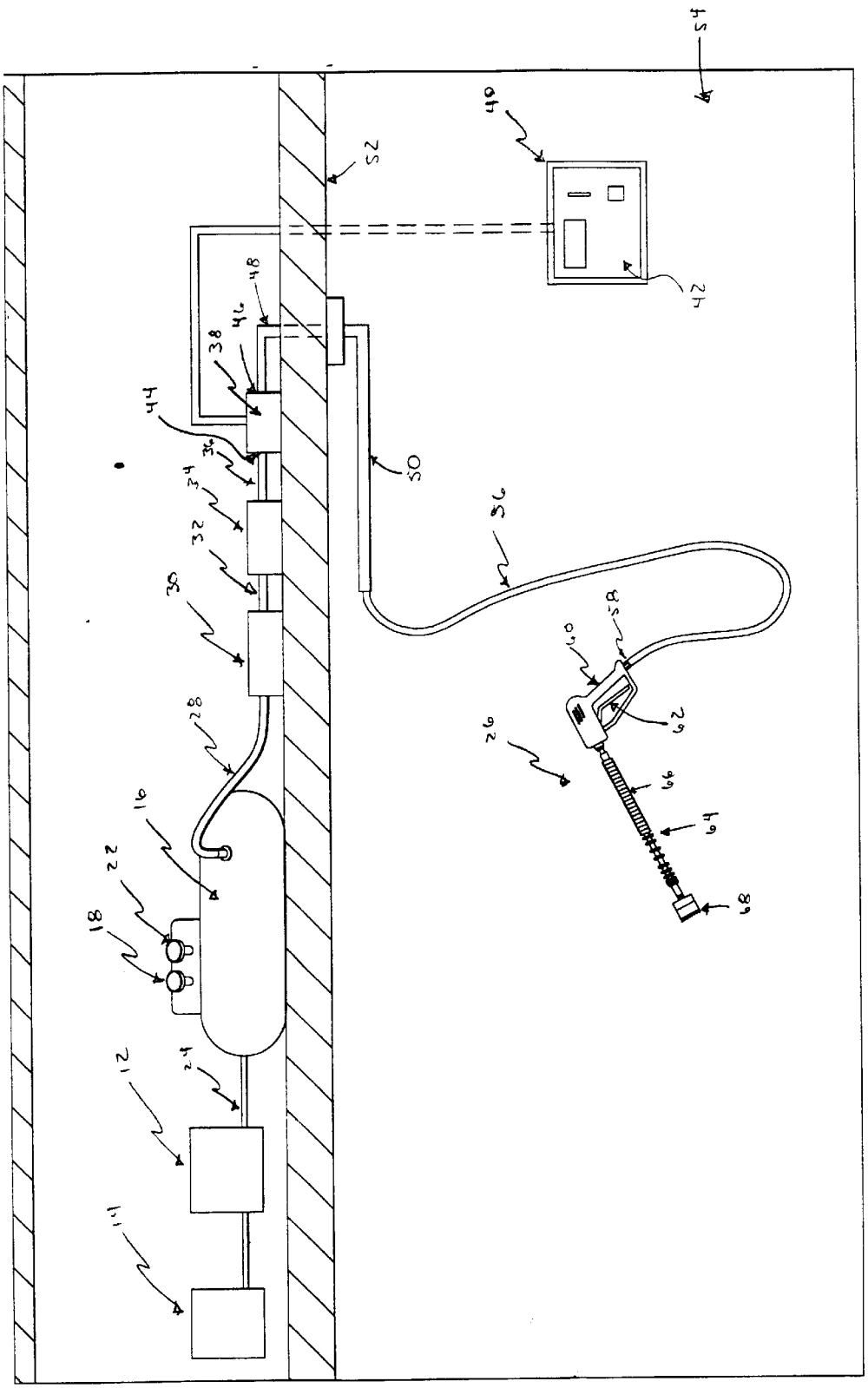
FIG. 1 is a side elevation view of the system for drying.
Figure 2:
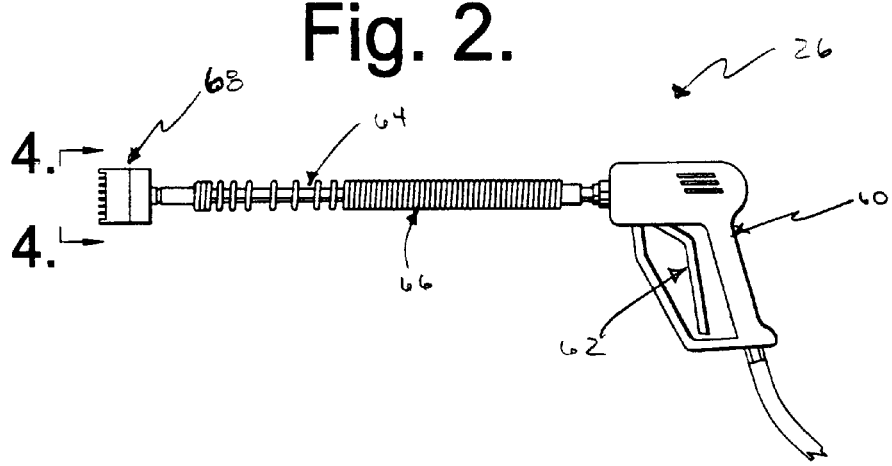
FIG. 2 is a side view of the spray wand.

As seen in FIGS. 1 and 2, the system includes means for compressing and storing air, as well as equipment for delivering the compressed air to a precise area on a vehicle by the system user. When the system is activated, the stored air is released from a storage tank, or similar member, and exits through the end of the wand. The user aims the wand at a point on the vehicle; resultingly, air is projected onto the vehicle surface.

The system 10 includes an air compressor 12 supplied with power by a 240 volt, three phase power supply 14 and designed to compress an adequate amount of air to maintain a sufficient amount of compressed air in a storage tank 16. The air compressor can have any of a variety of capacities so long as there is sufficient capacity in the system to cause delivery of at least 50 cubic feet per minute ("ft$^3$/min") of compressed air at a minimum of 50 pounds per square inch (psi). More importantly, sufficient pressure must be maintained to project air under enough force to substantially dry a vehicle surface. Preferably the compressor 12 has a capacity ranging between five to twenty horsepower. The horsepower required of the compressor 12 is a function of the number of car wash bays that will utilize the compressed air supply. An example of a preferred air compressor 12 is manufactured by Ingersoll Rand.

The air from the compressor 12 is fed into either single or multiple storage tanks 16 depending upon the number of car wash bays connected to the system. The storage tanks 16 serve to store the compressed air delivered by the compressor thereby providing for a uniform flow rate of air once the drying system is activated. Each storage tank 16 has a capacity of approximately 80 gallons and stores the air at a pressure of at least 300 pounds per square inch (psi). A pressure of 300 psi is selected because this is believed to best allow suitable air flow downstream in the system and to maintain a system in more than one car wash bay. Other storage pressures may be selected as long as sufficient air flow is maintained. Additionally, other size tanks may be used, dependent upon the particular car wash. The tanks are fitted with a pressure switch 18 that communicates with the compressor when the air pressure in the tanks reaches approximately 300 psi. Likewise, when the pressure in the tank drops below a preselected value, the same pressure switch 18 signals the compressor 12 to commence operation. The tanks are fitted with safety valves 22 in the event an over pressure does occur causing excess pressure to bleed out of the system before a rupture results.

The storage tanks are typically adjacent to the compressor and are connected to the compressor by piping 24. Any size piping 24 can be used, however, it is preferred if the piping 24 has an internal diameter of at least ⅜ inches and is capable of handling air at a pressure of 300 psi.

Additionally, air pressure in the tanks cannot be established at levels too high, otherwise the system becomes cost prohibitive. Furthermore, air exiting the wand 26 at high pressures and flow rates could result in the wand being difficult to control thereby resulting in injuries if the wand were to escape the grasp of the patron and strike them. At the same time, insufficient air pressure and flow rate will limit the efficient removal of water from the vehicle. Air at a pressure of approximately 125 psi and a flow rate of approximately 50 ft³/min provides an effective combination for removing water from a vehicle that is cost effective.

Air exits the storage tank 16 and travels through piping 28 of any size, however, it is preferred if the piping 28 has an internal diameter of at least ⅜ inches. Downstream from the storage tank, the compressed air contacts and passes through an air regulator 30. The regulator 30 ensures that the air exits at a pressure less than the pressure of the air in the storage tanks. Typically, the air contacts the regulator 30 at a pressure equal to about 250 psi and exits at a pressure equal to about 125 psi before delivery to the hand held wand. The pressure in the air tanks 16 must be higher than the pressure of the air exiting the wand 26 in order to ensure adequate flow. However, if the air pressure is too high, the wand 26 is difficult to hold. Thus, the regulator 30 is important to maintaining proper air pressure. The regulator employed by the drying system is an industry standard regulator. An example of a preferred air regulator is manufactured by Ingersoll Rand or ARO, Inc.

Compressed air exiting from the regulator passes through a hose 32 of any size, however, it is preferred if the hose has an inside diameter of at least ⅜ inch. The compressed air optionally flows from the regulator to an air dryer 34. The air dryer employed by the drying system is an industry standard air dryer 34 which can be purchased readily. An example of a preferred air dryer 34 is manufactured by Ingersoll Rand. The air dryer 34 removes water vapor from the compressed air by use of a desiccant or other functional system thereby producing low moisture air that facilitates removal of excess water from a vehicle surface and reduces the buildup of moisture in the drying system thereby minimizing corrosion of system components. In addition, an air dryer greatly reduces the amount of moisture that enters the system at the compressor 12 and which exits at the wand 26.

The air passes through the dryer 34 and into another pipe or conduit member 36. The pipe 36 can be of any size, however, it is preferred if the piping is at least ⅜ inch inside diameter. The pipe 36 delivers the low moisture air at approximately 125 pounds per square inch to the inlet side of a solenoid valve 38. The solenoid valve is used to control delivery of the air stream and controls whether the air exits the wand 26. A solenoid valve that is appropriately sized for the volume and pressure of the system is appropriate for this drying system. An example of a preferred solenoid valve is manufactured by DEMA Solenoid and Valve Company. The solenoid valve 38 can be of any size, however, it is preferred if the valve has an inside diameter of at least ⅜ inch to facilitate the flow of a sufficient volume of air to the wand 26.

The solenoid valve 38 is activated by a vending unit 40 capable of accepting coins, or bills. When a patron deposits sufficient coinage into the vending unit 40, a signal is transmitted to the solenoid valve 38 from the vending unit 40 causing the valve to open. The opening of the solenoid valve allows the compressed air to flow through the solenoid valve to the hand held wand. The solenoid valve 38 inhibits the flow of dry compressed air to the wand until the patron has deposited the appropriate amount of coinage into the vending unit. Once a particular amount of time has expired the valve then closes.

The vending unit 40 is a standard component comparable to that found in traditional car wash bays and which is readily available. An example of a preferred vending unit 40 is manufactured by IDX Incorporated. Integral to the vending 40 unit is a timing unit 42 that controls the amount of time the solenoid valve 38 remains open. When the vending unit 40 is activated by the deposit of coinage, the timing unit 42 is also activated and the duration of activation is based upon the value of the coinage inserted into the vending unit. Once the pre-selected time interval for use of the system has lapsed, the timing unit deactivates the solenoid valve 38 closing off the supply of compressed air.

Located opposite the inlet port 44 on the solenoid valve 38 is a solenoid valve exhaust port 46. Attached to the exhaust port 46 is a tube 48. The tube 48 can be of any size, however, it is preferred if the tubing is at least ⅜ inches internal diameter. Such tube 48 may also be connected to a rotatable boom 50 suspended from the ceiling 52 of the car wash bay 54. A second section of flexible tubing 56 which is coupled to, and supported by, the rotatable boom 50 provides the supply of compressed air to the wand 26. The tube can be of any size, however, it is preferred if the tubing is at least ⅜ inch internal diameter. The flexible tubing 56 is attached to the wand by a coupling or fitting 58.

Figure 3:
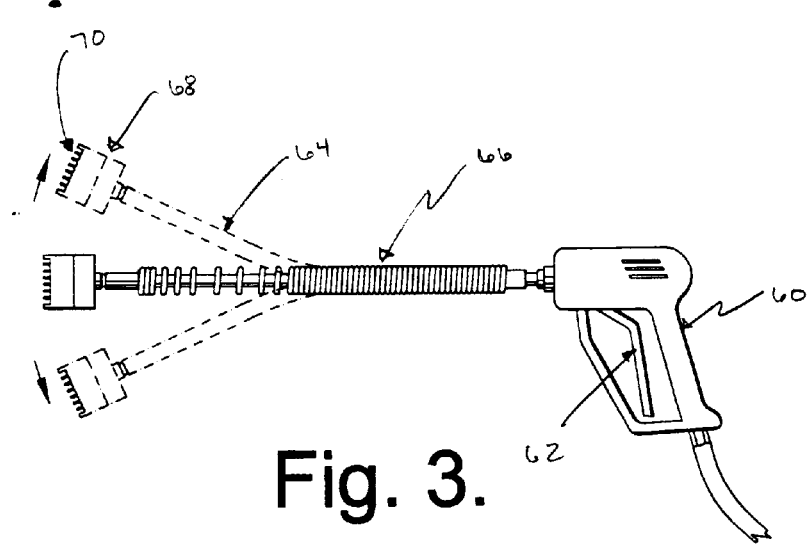
FIG. 3 is a side view of the spray wand revealing the flexible nature of the tubing and surrounding spring leading from the handle.
Figure 4:
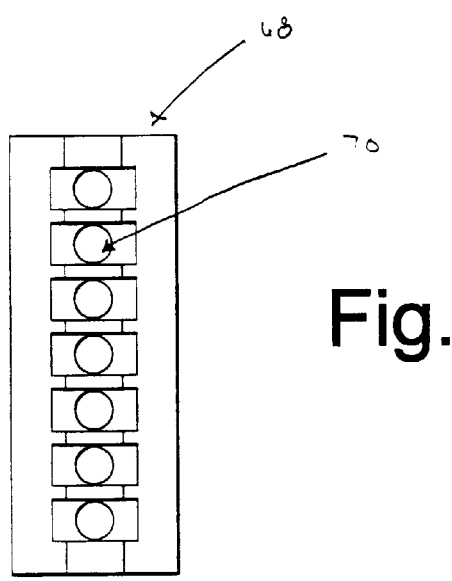
FIG. 4 is a front view of the wand nozzle revealing multiple orifices.

As seen in FIGS. 2 and 3, the wand 26 can have any of a variety of constructions as long as a handle 60 and trigger mechanism 62 is included to allow for a user to start and stop air flow. A preferred embodiment includes a flexible conduit 64 emanating from the handle 60 and trigger mechanism 62.

As seen in FIG. 3, the flexible conduit 64 is preferably wrapped in a coil spring 66 to support the conduit 64 and prevent the nozzle 68 from wildly flailing due to the reaction of the air escaping at a high speed from the nozzle 68. The wand 26 is preferably comprised of a trigger mechanism 62 and handle 60 that are molded from plastic for enhanced durability and which are less likely to dent and scratch the vehicle being dried. The wand handle 60 is further configured to be easy to grasp and to hold with one or two hands. The wand's trigger mechanism 62 initiates the flow of compressed air from the nozzle 68 of the flexible wand. The nozzle 68 is rubber coated metal or plastic and has at least one orifice 70 allowing a wide band of high speed air to sweep across the vehicle and to remove excess moisture. The nozzle 68 also protects the vehicle against inadvertent scrapes when impacted by the wand.

As the user of the system compresses the trigger mechanism 62 and allows the stream of air to move across the vehicle, the air residing in the storage tank 16 is depleted. Once the air pressure in the storage tank drops below a preset value, a pressure switch 18 is activated. The pressure switch 18 signals the air compressor to commence operation. As the air pressure inside the tank 16 climbs to a preset level, the pressure switch 18 deactivates the compressor 12. The process begins again as the system user depletes the supply of air from the storage tank.

Thus, there has been shown and described a novel product associated with a pressurized air system well suited for drying the surface of a vehicle, which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

What is claimed is:

1. A method suited for utilizing a compressed air vehicle drying system, the method comprising:

providing a control unit for initiating the flow of compressed air and for selecting the time interval for operation of the vehicle drying system;

providing an air compressor for compressing air, the compressor being initiated by the control unit;

providing an air tank for accumulating compressed air produced by the air compressor;

providing a conduit for delivery of compressed air from the air tank;

directing the compressed air through the conduit to an air drying unit for drying the compressed air to a preselected moisture content; and, directing the compressed air through the air dryer and the conduit against a vehicle surface.

2. The method of claim 1, wherein the system includes a vending unit designed to activate the system.

* * * * *